United States Patent Office 3,471,507
Patented Oct. 7, 1969

3,471,507
NEW ISOTHIAZOLE SYNTHESIS
Ronnie R. Crenshaw, De Witt, N.Y., assignor to Bristol-Myers Company, New York, N.Y., a corporation of Delaware
No Drawing. Filed July 25, 1966, Ser. No. 567,372
Int. Cl. C07d 91/12
U.S. Cl. 260—302                                                9 Claims

ABSTRACT OF THE DISCLOSURE

Isothiazoles, particularly 3,4,5-substituted isothiazoles, are of value as chemical intermediates in the synthesis of biologically active medicinal agents. As such a new and commercially feasible synthesis has been developed which entails reacting, for example, 3-imino-3-phenylpropionitrile with S-carboxymethyldithioacetate, followed by mild oxidation, to produce 4-cyano-5-methyl-3-phenylisothiazole.

BACKGROUND OF THE INVENTION

Field of the invention

A new process for the synthesis of isothiazoles.

Description of the prior art

Naito et al., U.S. Patent 3,341,518, suggests a variety of methods for the production of isothiazoles. None of these methods are identical to the instant process nor do they produce comparable yields.

SUMMARY OF THE INVENTION

The process of the instant invention comprises the consecutive steps of:
(1) heating the compounds $$\left. \begin{array}{c} R-C-CH_2-R^1 \\ \parallel \\ NH \\ \\ R-C-S-R^3 \\ \parallel \\ S \end{array} \right\} \xrightarrow{\Delta} [Z]$$

wherein R and $R^2$ are alike or different and each is (lower)alkyl or Ar, Ar being a group of the formula in which each of A, B and C represents hydrogen, fluoro, chloro, bromo, iodo, trifluoromethyl, methylsulfonyl, nitro, (lower)alkyl and (lower)alkoxy; $R^3$ is (lower)alkyl, (lower)aliphatic acid radical of the class $$-C_nH_{2n}CH_2CO_2H$$

(lower)aliphatic acid ester radicals of the class $$-C_nH_{2n}CH_2CO_2C_mH_{2m}CH_3$$

or—$C_nH_{2n}CH_2CN$ radicals in which $n$ and $m$ may be different and are each an integer of zero to 6 inclusive; $R^1$ represents $$-\overset{O}{\underset{\parallel}{C}}-OR^4, -CO_2H, -CN, -\overset{O}{\underset{\parallel}{C}}-NH_2, -\overset{O}{\underset{\parallel}{C}}-NHR^4, \text{ or } -\overset{O}{\underset{\parallel}{C}}-NR^4R^5$$

in which $R^4$ and $R^5$ are alike or different and each is (lower)alkyl or Ar, wherein Ar is defined above; Z is an intermediate of unknown structure; and (2) Oxodizing in situ the intermediate Z with a mild oxidizing agent to produce the isothiazole having the formula $$\begin{array}{c} R-C\text{------}C-R^1 \\ \parallel \quad\quad\quad \parallel \\ N \quad\quad\quad C \\ \diagdown \quad\diagup \diagdown \\ S \quad\quad R^2 \end{array}$$

in which R, $R^1$ and $R^2$ are as defined above.

DETAILED DESCRIPTION

This invention relates to a new and superior process for the synthesis of substituted isothiazoles, particularly 3,4,5-substituted isothiazoles, which compounds are most valuable as chemical intermediates in the further synthesis of biologically active compounds such as the isothiazole penicillins and cephalosporins.

The never ending search for new and improved antibacterials, such as the synthetic penicillins, has led to the synthesis of a series of substituted isothiazole derivatives of 6-aminopenicillanic acid. These penicillins have value as antibacterial agents, as nutritional supplements in animal feeds, as agents for the treatment of mastitis in cattle, as therapeutic agents in poultry and animals, including man, in the treatment of infectious diseases caused by Gram-positive bacteria, especially Staphylococcus aureus and other penicillinase producing bacteria, and sometimes those infections caused by Gram-negative bacteria.

The superior efficacy exhibited by the isothiazole penicillins required that a new and more efficient synthesis be developed for the preparation of large quantities of 3,4,5-substituted isothiazoles having the formula wherein R and $R^2$ are alike or different and each is (lower)alkyl or Ar, wherein Ar is a group of the formula in which each of A, B and C represents hydrogen, fluoro, chloro, bromo, iodo, trifluoromethyl, methylsulfonyl, nitro, (lower)alkyl and (lower)alkoxy.

Some of the isothiazoles prepared by the process described herein are compounds that have been prepared previously by methods that gave yields that were low and commercially undesirable.

T. Naito and S. Nakagawa, in their U.S. patent applications No. 466,414, filed on June 23, 1965, and No. 518,801, filed on Jan. 5, 1966, both said applications now being abandoned, have reported yields that were generally well below 10% in the synthesis of these types of isothiazoles. Furthermore, their methods involved numerous long and tedious steps.

The new and novel process claimed herein helps to solve both problems by producing superior yields by a more direct and efficient synthesis.

The invention claimed herein is a new and novel process for the synthesis of isothiazoles of the formula $$\begin{array}{c} R-C\text{------}C-CO_2H \\ \parallel \quad\quad\quad \parallel \\ N \quad\quad\quad C \\ \diagdown \quad\diagup \diagdown \\ S \quad\quad R^2 \end{array}$$

wherein R and R² are alike or different and each is (lower)alkyl or Ar, wherein Ar is a group of the formula $$\underset{C}{\overset{A}{\underset{B}{\bigcirc}}}$$

in which each of A, B and C represent hydrogen, fluoro, chloro, bromo, iodo, trifluoromethyl, methylsulfonyl, nitro, (lower)alkyl and (lower)alkoxy.

The process is usually performed by three consecutive steps which involve:

(1) The *heating* together of two reactants having the structures A and B to yield an intermediate Z.

$$\left.\begin{array}{l} \underset{NH}{\overset{R-C-CH_2-R^1}{\|}} \quad (A) \\ \underset{S}{\overset{R^2-C-S-R^3}{\|}} \quad (B) \end{array}\right] \xrightarrow{heat} [Z] + R^3-SH\uparrow$$

wherein R and R² are alike or different and each is (lower)alkyl or Ar, Ar being a group of the formula $$\underset{C}{\overset{A}{\underset{B}{\bigcirc}}}$$

in which each of A, B and C represent hydrogen, fluoro, chloro, bromo, iodo, trifluoromethyl, methylsulfonyl, nitro, (lower)alkyl and (lower)alkoxy; R³ is from the group consisting of (lower)alkyl, (lower)aliphatic acid radicals of the class —$C_nH_{2n}CH_2CO_2H$, (lower)aliphatic acid ester radicals of the class —$C_nH_{2n}CH_2CO_2C_mH_{2m}CH_3$ or —$C_nH_{2n}CH_2CN$ radicals in which n and m may be different and are each an integer from zero to six inclusive; R¹ represents —$\overset{O}{\underset{\|}{C}}$—OR⁴, —CO₂H, —CN, —$\overset{O}{\underset{\|}{C}}$—NH₂, —$\overset{O}{\underset{\|}{C}}$—NHR⁴, or —$\overset{O}{\underset{\|}{C}}$—NR⁴R⁵ in which R⁴ and R⁵ are alike or different and each is (lower)alkyl or Ar, wherein Ar is defined as above. Z, the intermediate resulting from the heating together of reactants A and B, is a mixture of several tautomeric forms, e.g., $$\left[\begin{array}{ccc} R-C=C-R^1 & R-C——C-R^1 & R-C——C-R^1 \\ |\phantom{X}\phantom{X}\phantom{X}C & \|\phantom{X}\phantom{X}C & \|\phantom{X}\phantom{X}C \\ NH_2\phantom{X}\diagdown\phantom{X}\diagup & NH\phantom{X}\diagdown\phantom{X}\diagup & NH\phantom{X}\diagdown\phantom{X}\diagup \\ S\phantom{X}R^2 & S\phantom{X}R^2 & HS\phantom{X}R^2 \end{array}\right] \rightleftarrows \rightleftarrows$$

and/or $$\left[\begin{array}{ccc} R-C——CH-R^1 & R-C=C-R^1 & R-HC——C-R^1 \\ \|\phantom{X}\phantom{X}CH & |\phantom{X}\phantom{X}CH & |\phantom{X}\phantom{X}C \\ N\phantom{X}\diagdown\phantom{X}\diagup & HN\phantom{X}\diagdown\phantom{X}\diagup & HN\phantom{X}\diagdown\phantom{X}\diagup \\ S\phantom{X}R^2 & S\phantom{X}R^2 & S\phantom{X}R^2 \end{array}\right] \rightleftarrows \rightleftarrows$$

For purposes of this disclosure, the tautomeric forms of Z and the mixtures thereof are thus represented by the general formula $$\underset{N\phantom{XX}S}{\overset{R-C——C-R^1}{\underset{\cdot 2H}{\phantom{X}}}}$$

Z may or may not be isolated in this process, but it is preferentially treated without isolation "in situ" with a mild oxidizing agent as described in step 2.

Reactants A and B, as illustrated above, are mixed together in various molar proportions but preferably a substantially equimolar mixture, either alone or in the presence of some inert solvent, with or without the presence of a strong base, e.g., sodium hydride or an alkali metal alkoxide.

When performed in the absence of a solvent, the mixture is heated under reduced pressure, e.g., about 0.1 mm. to 50 mm. mercury, to a temperature in the range of 50°–300° C., the pot temperature being determined by the decomposition point of the starting materials A and B and the distillation temperature of the side product mercaptan, which is represented as R³—SH. The residual melt is used as is in carrying out step 2.

When reactants A and B are heated together in the presence of an inert solvent, e.g., benzene, toluene, xylene, dioxane, tetrahydrofuran, dimethylformamide, dimethylsulfoxide, ether, with or without the presence of a strong base, e.g., sodium hydride or an alkali metal alkoxide, th mixture is refluxed for a period of time up to four hours. The solution is cooled and used in step 2.

(2) The *oxidation* of intermediate Z with a mild oxidizing agent to yield isothiazole (C)

$$[Z] \xrightarrow{[O]} \underset{N\phantom{XX}S}{\overset{R-C——C-R^1}{\underset{\phantom{X}}{\|}}}\phantom{XX}\overset{\phantom{X}}{\underset{C-R^2}{\|}} \quad (C)$$

wherein R and R² are as defined above and R¹ is

—CO₂H, —$\overset{O}{\underset{\|}{C}}$—OR⁴, —$\overset{O}{\underset{\|}{C}}$—NH₂, —$\overset{O}{\underset{\|}{C}}$—NHR⁴, —$\overset{O}{\underset{\|}{C}}$—NR⁴R⁵, or —CN Z, the intermediate obtained in step 1, is dissolved in an inert solvent, e.g., benzene, toluene, xylene, dioxane, ether, tetrahydrofuran, dimethylformamide, and subjected to mild oxidation by contact with a mild oxidizing agent such as 2,3 - dichloro - 5,6 - dicyano-1,4-benzoquinone, oxygen, air, I₂, Cl₂, Br₂, H₂O₂, sulfur, ferric chloride, Na₂S₂O₈, chloranil, halogen in combination with an acid scavenger, e.g., organic amines, alkali metal carbonates, but preferably with chloranil or I₂ in combination with an acid scavenger, e.g., K₂CO₃.

A solution of Z in an inert solvent is treated with a solution of the oxidizing agent, with stirring in a temperature range of 0°–100° C., but preferably at about room temperature for a period of 4 to 40 hours. The resultant mixture is usually washed with water, sodium thiosulfate solution, sodium hydroxide solution, dilute HCl, water and then dried over a drying agent. In vacuo evaporation of the solvent usually leaves a crystalline solid or semi-solid mass that can be purified to yield solid product (C).

(3) When R¹ is other than —CO₂H, the isothiazole (C) of step 2 is *hydrolyzed* to the desired 4-isothiazolecarboxylic acid by contact with acid or base.

$$\underset{N\phantom{XX}S}{\overset{R-C——C-R^1}{\underset{C-R^2}{\|}}} (C) \xrightarrow[(or)\;OH^-]{H_3{}^+O} \underset{N\phantom{XX}S}{\overset{R-C——C-CO_2H}{\underset{C-R^2}{\|}}} (D)$$

Isothiazole (C) is usually hydrolyzed by contact with acid or base, preferably strong mineral acid or alkali metal base, preferably with the aid of heat and preferably in a polar solvent such as methanol, ethanol, isopropanol, butanol, ethylene glycol, propylene glycol or aqueous solutions thereof. Dilution and acidification of the hydrolysis mixture usually yields a crystalline solid that is further purified by recrystallization to yield the desired 4 - isothiazolecarboxylic acid (D).

The starting materials in this process may be prepared by several known methods. Reactant A may be readily prepared by one of the following general methods:

(A)

$$R-NH_2 \xrightarrow{NaNO_2,\;CuCN} R-CN \xrightarrow[(1)]{Na,\;CH_3CN} \underset{NH}{\overset{R-C-CH_2-CN}{\|}}$$

(B)

$$R-CH=N-OH \xrightarrow[(2)]{(CH_3CO)_2O}$$

$$R-CN \xrightarrow{Na,\;CH_3CN} \underset{NH}{\overset{R-C-CH_2-CN}{\|}}$$

(C)

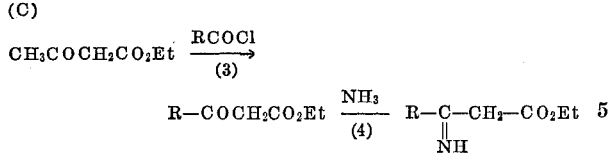

(D) 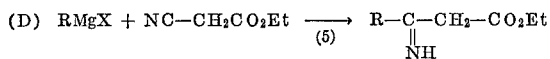

(E) 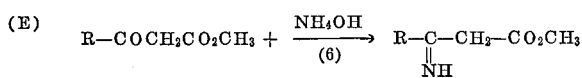

(F) 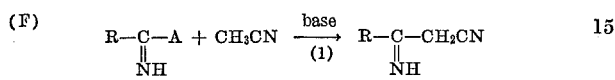

A can be O—alkyl or halogen (1) Beilstein, 10, 681; EI 10, 322; EII 10, 469; Holzwart, J. Prakt. Chem. (2), 39, 242; E. Von Meyer, J. Prakt. Chem. (2), 92, 174.

(2) M. S. Reich, Bull. Soc. Chim., France, (4) 21, 217 (1917).

(3) J. M. Straley and A. C. Adams, Org. Syn. Coll. vol. 4, 415(1963).

(4) cf. S. A. Glickman et al., J. Am. Chem. Soc., 67, 1017(1945).

(5) R. Lukes and J. Kloubek, Coll. Czechoslov. Chem. Communs., 25, 607 (1960); R. Lukes and J. Kovar, Chem. Listy, 50, 272 (1956).

(6) C. Korschum, Ber., 38, 1129 (1905).

Reactant B may likewise be readily prepared by one of the following general methods:

(A)

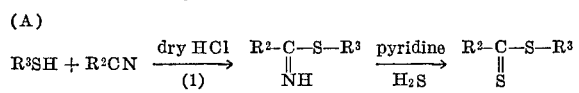

(B)

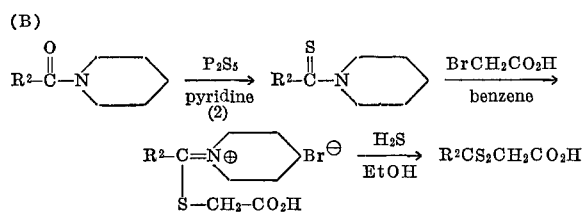

(C)

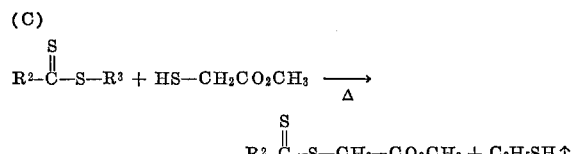

(D)

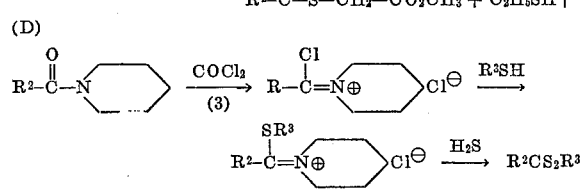

(1) C. S. Marvel, et al., J. Am. Chem. Soc., 77, 5997 (1955).

(2) Jensen and Pedersen, Acta Chem. Scand., 15, 1087 (1961).

(3) H. Eilingsfeld, et al., Chemische Berichte, 96, 2671 (1963).

The objectives of the present invention have been achieved, by the provision according to the present invention, of the process for the synthesis of isothiazoles having the formula

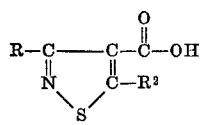

wherein R and $R^2$ are alike or different and each is (lower) alkyl or Ar-, wherein Ar is a group of the formula

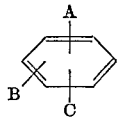

in which each of A, B and C represent hydrogen, fluoro chloro, bromo, iodo, trifluoromethyl, methylsulfonyl, nitro, (lower)alkyl and (lower)alkoxy; which comprises the consecutive steps of:

(a) *Heating* a mixture, and preferably a substantially equimolar mixture, of two reactants having the formulae

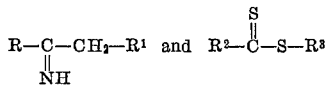

wherein $R^1$ represents

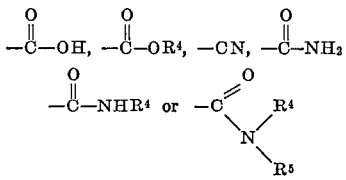

in which $R^4$ and $R^5$ are alike or different and are each (lower)alkyl or Ar-, and $R^3$ represents (lower)alkyl, radicals of the class —$C_nH_{2n}CH_2COOH$,

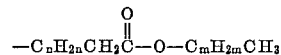

or —$C_nH_{2n}CH_2CN$ in which n and m are each an integer from zero to six inclusive, to a temperature in the range of 50°–300° C., preferably under reduced pressure, e.g., about 0.1 mm. to 50 mm. mercury, in the absence of a solvent *or* in an inert solvent selected from the group consisting of benzene, toluene, xylene, ether, tetrahydrofuran, dioxane, dimethylsulfoxide and dimethylformamid up to reflux temperature preferably with the addition of an alkali metal alkoxide or hydride as a catalyst;

(b) Subjecting the heated mixture to *mild oxidation* by contact with a mild oxidizing agent such as 2,3-dichloro-5, 6-dicyano-1, 4-benzoquinone, oxygen, air, $I_2$, $Br_2$, $Cl_2$, halogen in combination with an acid scavenger, $H_2O_2$, sulfur, $FeCl_3$, $Na_2S_2O_8$, chloranil and, preferably Iodine in combination with an acid scavenger such as an alkali carbonate, e.g., $K_2CO_3$, in an inert solvent selected from the group consisting of benzene, toluene, xylene, ether, tetrahydrofuran, dioxane and dimethylformamide at a temperature in the range of 0°—100° C. and preferably at about room temperature, for a period of 4 to 40 hours and when $R^1$ is other than

(c) *Hydrolyzing* the resultant, oxidized product to a compound of the formula

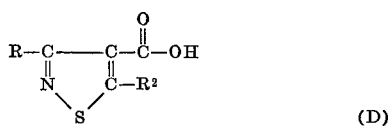 (D)

by contact with acid or base, preferably by strong mineral acid or alkali metal base, preferably with the aid of heat, and preferably in a polar solvent such as methanol, ethnol, isopropyl alcohol, butanol, ethylene glycol, propylene glycol or aqueous solutions thereof.

In the preferred embodiments of the present invention R is Ar as defined above and especially phenyl, halophenyl and dihalophenyl, $R^1$ is —$CO_2H$, —CN or —$CO_2R^4$ wherein $R^4$ is defined above, $R^2$ is (lower)alkyl and especially methyl, $R^3$ is (lower)alkyl or radicals of the class —$C_nH_{2n}CH_2CO_2H$, —$C_nH_{2n}CH_2CO_2C_mH_{2m}CH_3$ or —$C_nH_{2n}CH_2CN$ in which $n$ and $m$ are each an integer from zero to six inclusive, but especially —$CH_2CO_2H$, —$CH_2CH_2CO_2H$, —$CH_2CO_2CH_3$, —$CH_2CO_2CH_2CH_3$, —$CH_2CN$ and —$CH_2CH_2CN$.

EXAMPLE I

3-imino-3-phenylpropionitrile

The presentation of 3-imino-3-phenylpropionitrile generally followed the procedure of Holzwart, J. Prakt. Chem. [2], 39, 242.

50% sodium dispersion in paraffin oil (72.5 g.) was suspended in a mixture of 300 ml. of benzene and 250 ml. of toluene. A mixture of benzonitrile (81.5 g.) and acetonitrile (64.5 g.) was added to the suspension with cautious heating, whereupon a gentle reflux commenced that was maintained by the addition rate of the nitriles. When the addition was complete, the reaction was refluxed for 18 hours.

The mixture was cooled to 5° C. and filtered. The gummy solids were slurried in 1.5 l. of pentane and filtered to remove the paraffin oil. The solids were stirred with one liter of water for one hour, the solids removed by filtration and sucked dry on the filter. The solid was recrystallized twice from benzene-petroleum solvent, B.P. 60–68° C. essentially n-hexane (Skellysolve B), to yield 48.0 g. (42%) M.P. 79–80°, of the desired product.

N-thioacetylpiperidine

Phosphorous pentasulfide (36.5 g.) was suspended in 45 ml. of pyridine. N-acetylpiperidine (42.3 g.) in 45 ml. of pyridine was added to the suspension with cooling. The yellow suspension was heated and allowed to reflux for 2 hours.

After refluxing, the black mixture was concentrated in vacuo to near dryness and the resulting residue was treated with 150 ml. 3 N HCl. The resultant black liquid and tar was extracted twice with ether. The dark red ether solution was washed with water, then brine and dried over $Na_2SO_4$. Evaporation of the ether following filtration, left 23.5 g. (48%) of a red crystalline solid, M.P. 50–52° C.

S-carboxymethyl-1-ethylthiopiperidium bromide

N-thioacetylpiperidine (23.57 g.) was dissolved in 150 ml. of dry benzene. Bromoacetic acid (25.2 g.) dissolved in 44 ml. benzene was added and the resultant mixture was allowed to stir at room temperature for 22 hours. A precipitate formed several minutes after the addition of the bromoacetic acid.

The reaction mixture was diluted with 550 ml. of dry ether and filtered. A pale pink solid was collected, triturated with dry ether, filtered and dried in vacuo over $P_2O_5$ to yield 43.3 g. of pale pink crystals, M.P. 159–160°.

S-carboxymethyldithioacetate

S-carboxymethyl-1-thioethylpiperidium bromide (20.0 g.) was mixed with absolute ethanol (90 ml.), cooled to 0° C. and hydrogen sulfide was bubbled into the suspension. The suspension became a dark red solution in about an hour. After bubbling $H_2S$ into the solution for a total of four hours, the solution was stored at 4° C. for 17½ hours.

The red solution, containing some yellow precipitate, was concentrated in vacuo to near dryness and the residue was extracted several times with ether. The ether solution was dried over $Na_2SO_4$, filtered and taken to dryness in vacuo. The red oil crystallized to yield 11.6 g. of red crystals.

The crystals were extracted with boiling "Skellysolve B," which yielded 7.68 g. (72%) of crystals upon cooling, M.P. 79–81° C. Jensen and Pedersen, Acta. Chem. Scand., 15, 1087 (1961).

4-cyano-5-methyl-3-phenylisothiazole

A mixture of 3-imino-3-phenylpropionitrile (5.00 g., 0.0347 mole) and S-carboxymethyldithioacetate (5.20 g., 0.0347 mole) was stirred at 105–109° under 0.3 mm. pressure for 28 minutes. Mercaptoacetic acid distilled from the reaction mixture. After cooling under nitrogen, the residual melt was dissolved in benzene (60 ml.). Potassium carbonate (7.20 g., 0.052 mole) was added, and then a solution of iodine (13.20 g., 0.052 mole) in benzene (160 ml.) was added.

After stirring at 28° for 15 hr., the supernatant solution was washed in succession with aqueous sodium thiosulfate solution, aqueous sodium hydroxide solution and water. Drying and subsequent removal of the solvent left crystalline solid (2.36 g., 34%). Recrystallization (Skellysolve B) gave material having a melting point of 76–78°.

5-methyl-3-phenyl-4-isothiazolecarboxylic acid

A mixture of 4-cyano-5-methyl-3-phenylisothiazole (1.45 g.), ethylene glycol (8.9 ml.), water (1.8 ml.) and potassium hydroxide (0.885 g.) was heated under reflux for 48.5 hr.

The mixture was poured onto ice (30 g.). Acidification with hydrochloric acid (6 N) gave crystalline solid which was washed with water and dried; yield, 1.45 g. (91%), M.P. 148–151°. Recrystallization (benzene/Skellysolve B) gave 1.19 g., M.P. 151–153°.

5-methyl-3-phenylisothiazole-4-carbonyl chloride

A mixture of 3.2 g. (0.0147 mole) 5-methyl-3-phenyl-isothiazole-4-carboxylic acid and 5 ml. thionyl chloride was warmed on a water bath at 70–80° C. for one hour. The excess thionyl chloride was removed by distillation under reduced pressure to give an oil which was distilled in vacuo. Yield 3.2 g. (95%) of 5-methyl-3-phenylisothiazole-4-carbonyl chloride, B.P. 122–125° C/0.6 mm.

$\nu_{max}^{liquid}$ 1770, 1490, 1450, 1400, 1360, 1230, 1105 cm$^{-1}$

Sodium 6-(5-methyl-3-phenylisothiazole-4-carboxamido)-penicillanate

A solution of 3.2 g. (0.0136 mole) 5-methyl-3-phenyl-isothiazole-4-carbonyl chloride in 5 ml. methylene chloride was added over a period of two minutes to a rapidly stirred solution of 3 g. (0.0138 mole) 6-aminopenicillanic acid and 3.0 g. (0.03 mole) triethylamine in 50 ml. methylene chloride at 5–10° C. The reaction mixture was stirred for one hour at 15° C. and extracted with three 50 ml. portions of water. The combined water extracts were washer with two 50 ml. portions of ether, layered with 100 ml. ethyl acetate and adjusted to pH. 2 with 10% hydrochloric acid. The ethyl acetate layer was separated and the water layer was again extracted with two 100 ml. portions of ethyl acetate.

The combined ethyl acetate extracts were washed with 50 ml. water, dried with sodium sulfate, filtered (an additional 50 ml. ethyl acetate was used for washing the flask and filter) and treated with 4 ml. of SEH (39% sodium 2-ethylhexanoate in methyl isobutyl ketone). The clear solution was evaporated to a volume of about 200 ml. and the separated fine needles of sodium 6-(5-methyl-3-phenylisothiazole-4-carboxamido)-penicillanate (Crop A) were collected by filtration. A second crop (Crop B) was obtained from the filtrate by an addition of dry ether. Yield: A, 1.97 g. (33%); B, 0.38 g. (6%), M.P.: A, 184–190° C. (dec.); B, 180–190° C. (dec.).

$\lambda_{max.}^{H_2O}$ 266.5 mμ (ε 11,200, $\nu_{max.}^{H_2O}$ 1780, 1665, 1615, 1540, 1410, 1330 cm$^{-1}$.

*Analysis.*—Calc'd for $C_{19}H_{18}N_3O_4S_2Na \cdot H_2O$: C, 49.88; H, 4.11; N, 9.19. Found: C, 50.31, 49.69; H, 4.91, 4.61; N, 9.02, 9.23.

This compound in vitro exhibited minimum inhibitory concentrations of 0.4–0.8 mcg./ml. vs. *Staphylococcus aureus* Smith and of 0.8 mcg./ml. vs. benzylpenicillin-resistant *Staphylococcus aureus* BX–1633–32 and in mice versus *S. aureus* BX–1633–32 exhibited a CD$_{50}$ of about 1.56 mgm./kg. upon intramuscular injection. This compound was also very stable in aqueous acid, having a half-life of 4 hours at pH 2.0.

EXAMPLE 2

Ethyl thioimidoacetate hydrochloride

A solution of ethanethiol (50 g.) in acetonitrile (33.2 g.) was cooled in an ice-salt bath following which hydrogen chloride gas (30 g.) was bubbled into the stirred solution for 1.5 hours. Addition of the hydrogen chloride was continued for approximately 10 minutes more, whereupon the solution crystallized. The solid mass was allowed to stand at 25° C. for 3 days.

The light yellow solid was triturated with ether, separated by filtration, washed well with additional ether, then dried in vacuo over P$_2$O$_5$ and KOH pellets to yield 100.7 g. (90%) of white crystalline solid. Schmidt, Ber., 47,2545 (1914).

Ethyl dithioacetate

Pyridine (100 ml.) was saturated with hydrogen sulfide at 0° C. for 75 minutes. Ethyl thioimidoacetate hydrochloride (45 g.) was added and the mixture was stirred in an ice-salt bath while additional hydrogen sulfide was bubbled into the mixture for an additional 7 hours.

Fifty ml. of water at 0° C. was added to the mixture. After stirring at 0° C. for 5 minutes, the solution was poured onto a mixture of concentrated HCl (150 ml.), H$_2$O (50 ml.) and ice (150 g.).

The mixture was immediately extracted with ether, the aqueous layer again extracted with ether. The combined ether extracts were washed with a cold solution of 10 ml. conc. HCl in 30 ml. of water and dried over anhydrous K$_2$CO$_3$.

Evaporation of the ether left a yellow oil which was distilled through an 8 inch Vigreux column to yield a deep yellow oil, B.P. 49–50°/14 mm., 30.8 g. (80%). Marvel, J. Am. Chem. Soc., 77, 5997(1955).

Ethyl 3-aminocinnamate

To a stirred suspension of 600 ml. of dry ether and 16.9 g. of magnesium turnings was added 5 ml. of bromobenzene. The reaction was started using 2 ml. of iodomethane and an iodine crystal.

The reaction rate was maintained by the addition of bromobenzene until a total of 103.0 g. was added. The reaction mixture was refluxed for one hour following the completion of the addition.

Ethyl cyanoacetate (30.0 g.) was added dropwise over 30 minutes and the reaction mixture refluxed for 20 hours.

The reaction mixture was cooled and cautiously decomposed by the addition of 180 ml. of 3.5 N sulfuric acid with cooling and rapid stirring. The ether layer was separated, dried over sodium sulfate, taken to dryness in vacuo and distilled at reduced pressure to yield 37.3 g. (73%) of yellow oil, B.P. 128–128.5° C./1 mm.

R. Lukes and J. Kloubek, Coll. Czechoslov. Chem. Communs., 25, 607 (1960) (Chem. Abs., 50, 7796); R. Lukes and J. Kovar, Chem. Listy, 50, 272 (1956) (Chem. Abs. 54, 11984).

4-ethoxycarbonyl-5-methyl-3-phenylisothiazole

A solution of ethyl-3-aminocinnamate (1.78 g.) in dimethylformamide (5 ml.) was added dropwise to sodium hydride (0.4 g. of 56% dispersion) in dimethylformamide (5 ml.) while stirring the mixture with cooling by an ice-salt bath.

After stirring for 30 minutes at 0° C., the mixture was stirred for 20 minutes at room temperature, at the end of which time the NaH appeared to have been consumed.

A solution of ethyldithioacetate (1.12 g.) dissolved in benzene (10 ml.) was added rapidly to give a deep red solution and the evolution of some heat.

The reaction was stirred for four and one-half hours at room temperature, following which it was heated at 40° C. to remove the ethanethiol.

Ten ml. of the mixture was diluted with ether and the mixture was neutralized with 55 ml. of cold 0.126 N HCl, washed with brine, dried over Na$_2$SO$_4$ and evaporated in vacuo to yield a red oil. The oil was dissolved in dry ether and divided into 2 equal parts.

(A) Part one of the above was treated with 20 ml. of absolute ethanol containing 0.4 ml. of 30% H$_2$O$_2$. After stirring overnight the solution was evaporated in vacuo, the residues dissolved in ether, washed with 0.1 N HCl, brine and water and again taken to dryness to yield 0.7 g. of a dark red oil which contained some desired isothiazole as determined by vapor pressure chromatography (VPC).

(B) Part two of the above was stirred with potassium carbonate while a solution of 0.92 g. of iodine in 20 ml. of ether was slowly added. The reaction mixture was stirred at room temperature for 12 hours. The solution was washed with 0.1 N CCl, aqueous Na$_2$S$_2$O$_3$, brine and water, dried over Na$_2$SO$_4$ and taken to a black gum in vacuo, 0.97 g. VPC indicated the desired isothiazole and the starting 3-aminocinnamate.

5-methyl-3-phenyl-4-isothiazolecarboxylic acid

The desired acid can be prepared from the above prepared 4-ethoxycarbonyl-5-methyl-3-phenylisothiazole by a simple hydroysis procedure using 5% NaOH in aqueous alcohol.

EXAMPLE 3

4-cyano-5-methyl-3-phenylisothiazole—Different oxidizing agents 3-imino-3-phenylpropionitrile (5.0 g.) and S-carboxymethyldithioacetate (5.2 g.) were dissolved in ether. The solvent was evaporated to leave a homogeneous oil that was heated at approximately 105°–109° for 35 minutes at 0.3 mm.

The residue was cooled to 20° under nitrogen and diluted up to 54 ml. with benzene.

The solution was divided into four aliquots of 12 ml. and one of 5 ml. which were submitted to different oxidation techniques.

(A) Treatment of a twelve ml. aliquot first with 2.94 g. of iodine in benzene and then 1.6 g. of potassium carbonate, as previously described in Example 1, gave 0.75 g. of oil determined to be mainly desired isothiazole by VPC.

(B) Treatment of a twelve ml. aliquot first with 1.6 g. of potassium carbonate then followed by 2.94 g. of iodine in benzene and worked up in a manner described in Example 1, yielded 0.82 g. of red oil determined to be mainly desired product by VPC.

(C) Treatment of a twelve ml. aliquot with just 1.97 g. of iodine in benzene, worked by by Na$_2$S$_2$O$_3$ washings, etc., gave 0.77 g. of red brown oil that was determined to be about 90% desired product by VPC.

(D) A solution of 30% H$_2$O$_2$ in diglyme (20 ml.) was added to a twelve ml. aliquot. The solution was stirred at 28° C. for 16 hours. The mixture was washed with Na$_2$S$_2$O$_3$, 0.5 N NaOH, water and brine. Evaporation left 0.85 g. of an orange oil determined to be approximately 50% desired isothiazole.

(E) Oxygen was bubbled through the 5 ml. aliquot for 20 minutes and the solution was allowed to evaporate. Following basic and water washing, the 0.3 g. of semi-solid was determined to be approximately 20% desired isothiazole. Further study indicated the yields would rise on longer exposure to oxygen.

EXAMPLE 4

4-cyano-5-methyl-3-phenylisothiazole

A solution of 3-imino-3-phenylpropionitrile (1.0 g.) in 10 ml. of dry dimethylformamide was added to a cold suspension of 0.3 g. of sodium hydride in 10 ml. of dry dimethylformamide. The mixture, which evolved hydrogen gas, was allowed to stir for 6 minutes with cooling and then an additional 38 minutes at room temperature.

A solution of 0.835 g. of ethyldithioacetate (0.835 g.) in 10 ml. of dry benzene was added to the reaction mixture. After several minutes of stirring the mixture became a deep red solution. The solution was heated for one hour at approximately 55° C., cooled and oxidized using 2.62 g. of iodine in 35 ml. of benzene along with 1.30 g. of $K_2CO_3$.

After stirring at room temperature for 16 hours, the mixture was washed with water, aqueous $Na_2S_2O_3$, dilute HCl, water, 1 N NaOH, water then dried over $Na_2SO_4$. Evaporation left 0.56 g. of dark oil, which was determined to be approximately 40% of the desired isothiazole.

EXAMPLE 5

S-methoxycarbonylmethyldithioacetate

A solution of ethyldithioacetate (25.42 g., 0.212 mole) and methyl mercaptoacetate (22.56 g., 0.212 mole) in pyridine (80 ml.) was heated under reflux for 0.5 hr. The pyridine then was removed by distillation (760 mm.). Distillation of the residue gave the dithioacetate; yield, 15.36 g. (45%), B.P. 100–109°/8 mm.

*Analysis.*—Calc'd. for $C_5H_8O_2S_2$: C, 36.56; H, 4.91; S, 39.04. Found: C, 36.67; H, 4.98; S, 38.46.

4-cyano-5-methyl-3-phenylisothiazole 3-imino-3-phenylpropionitrile (2 g.) dissolved in dimethylformamide (20 ml.) was added to sodium hydride dispersion (6.0 g.) in 20 ml. of dimethylformamide with stirring at room temperature. After 30 minutes, S-methoxycarbonylmethyldithioacetate (2.3 g) dissolved in benzene (20 ml.) was added. The reaction mixtaure was stirred for 30 minutes at room temperature and then heated for one hour at 49–50° C.

The mixture was cooled to room temperature following which $K_2CO_3$ (2.9 g.) and iodine (5.3 g.) dissolved in 70 ml. of benzene were added. The mixture was stirred at 28° C. for 16 hours, then treated with a water, aqueous $Na_2S_2O_3$ and brine wash. The solution was dried over $Na_2SO_4$, and taken to a black oil (3.75 g.) in vacuo. Vapor pressure chromatographic analysis indicated the oil was 65% desired isothiazole.

EXAMPLE 6

4-ethoxycarbonyl-5-methyl-3-phenylisothiazole.

A solution of ethyl β-aminocinnamate (158.1 mg., 0.826 mole) and S-carboxymethyldithioacetate (124.0 mg., 0.826 mole) in dimethylsulfoxide (10 ml.) was heated under reflux for 1 hr. After cooling, a solution of iodine (320 mg., 1.26 mole) in benzene (6 ml.) was added, and then potassium carbonate (180 mg., 1.3 mole) was added.

After stirring 16 hr. at 28°, the mixture was diluted with benzene and the solution was washed with aqueous sodium thiosulfate solution, aqueous sodium hydroxide and water. Drying and subsequent removal of the solvent left 50 mg. (25%) of the ester contaminated with acetophenone and ethyl β-amino-cinnamate. The ester (isolated by vapor phase chromatography) was identical with an authentic sample prepared from 5-methyl-3-phenyl-4-isothiazolecarboxylic acid.

The ester may similarly be prepared from the sodium salt of ethyl β-aminocinnamate and ethyldithioacetate.

5-methyl-3-phenyl-4-isothiazolecarboxylic acid

The desired acid can be prepared from the above ester by a simple hydrolysis procedure using 5% NaOH in aqueous alcohol, M.P. 151–153° C.

EXAMPLE 7

3-imino-3-(2′-chlorophenyl)-propionitrile

50% sodium dispersion in paraffin oil (36 g.) was suspended in a solution of 146 ml. of benzene and 120 ml. of toluene.

A solution of acetonitrile (34 g.), o-chlorobenzonitrile (52 g.) and benzene (25 ml.) was cautiously added to the sodium suspension. The reaction was started with the aid of heat and then maintained at reflux temperatures by the rate of addition of the nitriles. When the addition was complete, the reaction mixture was refluxed for 6 hours.

The brown suspension was cooled to 5° C. and filtered. The resultant filter cake was resuspended in benzene, filtered and washed thoroughly to remove any residual paraffin oils.

The solids were slurried with an excess of $NH_4Cl$ solution for 30 minutes then collected by filtration to yield 53.7 g. (79.5%), M.P. 90–95°.

The solids were dissolved in ethanol, partially decolorized with Darko KB and recrystallized from ethanol-water to yield 24 g. (35.5%), of light orange crystals, M.P. 101–104° C. Von Meyer, J. Prakt. Chem. [2], 92, 174.

3-(2-chlorophenyl)-5-methyl-4-isothiazolecarbonitrile

A mixture of 3-(2-chlorophenyl)-3-iminopropionitrile (5.00 g., 0.028 mole) and S-carboxymethyldithioacetate (4.20 g. 0.028 mole) was heated at 116–125° under 7 mm. pressure for 36 minutes. After cooling under nitrogen, the residue was dissolved in benzene (100 ml.). Potassium carbonate (5.8 g., 0.042 mole) was added and then a solution of iodine (10.70 g., 0.042 mole) in benzene (120 ml.) was added.

After stirring at 28° for 16 hours, the mixture was worked-up as previously described to yield a mixture (3.1 g.) of the desired nitrile and the starting iminonitrile The mixture was separated by chromatography on alumina to yield the nitrile (1.32 g., 20%); recrystallization (ethanol) gave M.P. 86–87°.

*Analysis.*—Calc'd. for $C_{11}H_7ClN_2S$: C, 56.28; H, 3.00; Cl, 15.11. Found: C, 56.10; H, 3.11; Cl, 14.91.

3-(2-chlorophenyl)-5-methyl-4-isothiazolecarboxylic acid

3 - (2 - chlorophenyl) - 5 - methyl - 4 - isothiazolecarbonitrile (1.02 g.) was hydrolyzed by the procedure previously described; yield of the acid was 1.04 g. (94%).

Recrystallization (benzene/Skellysolve B) gave material with a M.P. 185.5–186-5°.

3-(2-chlorophenyl)-5-methylisothiazole-4-carbonyl chloride

A mixture of 2.7 g. (0.0107 mole) of 3-(2-chlorophenyl)-5-methylisothiazole-4-carboxylic acid and 3 ml. of thionyl chloride was heated on a water bath at 80° C. for 30 minutes. The excess thinoyl chloride was removed by distillation under reduced pressure and the residue was distilled in vacuum. Yield 2.55 g. (88%) of 3-(2-chlorophenyl)-5-methylisothiazole-4-carbonyl chloride, B.P. 130–135° C./3 mm.

$v_{max}^{liquid}$ 1760 $cm^{-1}$.

Sodium 6-[3-(2-chlorophenyl)5-methylisothiazole-4-carboxamido]penicillanate

To a stirred mixture of 2.5 g. (0.0115 mole) of 6–APA, 2.9 g. (0.034 mole) of sodium bicarbonate, 80 ml. of water and 50 ml. of acetone was added dropwise a solution of 2.55 g. (0.0094 mole) of 3-(2-chlorophenyl)-5-methylisothiazole - 4—carbonyl chloride in 30 ml. of dry acetone at 5° C. and stirring was continued for 30 minutes at 10–15° C. The reaction mixture was washed twice with 100 ml. of portions of ether, layered with 100 ml. of ethyl acetate and adjusted to pH 2.0 with dilute hydrochloric acid at 5° C. The ethyl acetate layer being separated, the water layer was extracted with two 50 ml. portions of ethyl acetate. The combined ethyl acetate extracts were washed with water, dried with anhydrous sodium sulfate and evaporated to ¾ of its volume. The concentrate was treated with 35% SEH to give a crystalline precipitate of sodium 6-[3-(2-chlorophenyl) - 5-methylisothiazole - 4 - carboxamido]penicillanate, which was collected by filtration. When the precipitate was washed with acetone, it showed a tendency to dissolve in the solvent. The remaining precipitate B (1.3 g.) was washed with ethyl acetate. On the other hand, to the acetone solution containing a part of sample was added five volumes of ethyl acetate. The resulting solution was concentrated slightly to give 1.6 g. of sodium 6-[3 - 5 - (2-chlorophenyl) - 5 - methylisothiazole-4-carboxamido]penicillanate crystals designated as A. Crystalline forms A and B are different from each other in IR spectra but are almost the same in microbiological activities. B was also recrystallized from acetone and ethyl acetate to give 0.6 g. of crystals which show an IR spectrum identical with that of A. Total yield 2.2 g. (50%).

B: M.P. 182–188° C. (dec.). $\mu_{max}^{KBr}$ 1760, 1650, 1595, 1530, 1405 cm$^{-1}$. $\lambda_{max}^{H_2O}$ 258 m$\mu$ ($\epsilon$9,100).

A: M.P. 182–188° C. (dec.). $\mu_{max}^{KBr}$ 3530, 3370, 1765, 1650, 1600, 1510, 1480, 1410 cm$^{-1}$. $\lambda_{max}^{H_2O}$ 257.5m$\mu$ (9,400).

*Analysis.*—Calc'd for $C_{19}H_{17}ClN_3O_4S_2Na_{3/2}H_2O$: C, 45.55; H, 4.02; N, 8.39. Found: C, 45.31; 45.66; H, 3.83, 4.16; N, 8.45, 8.95.

Crystalline form A of this penicillin in vitro exhibited minimum inhibitory concentratons of about 0.4 mcg./ml. versus *S. aureus* Smith and about 0.4 mcg./ml. versus benzylpenicillin-resistant *S. aureus* BX1633-2 and in mice upon intramuscular injection exhibited $CD_{50}$'s of about 72 mgm./kg. versus *S. aureus* Smith and about 200 mgm./kg. versus *S. aureus* BX1633-2. This penicillin was also very stable in aqueous acid, having a half-life of 3.3–3.7 hours at pH 2 and 37° C.

EXAMPLE 8

3-(2,6-dichlorophenyl)-5-methyl-4-isothiazole-carbonitrile

A mixture of 3-(2,6-dichlorophenyl)-3-iminopropionitrile (10.14 g., 0.0476 mole) and S-carboxymethyldithioacetate (7.50 g., 0.050 mole) was heated at 145–162° under 7 mm. pressure for 20 minutes. Mercaptoacetic acid distilled from the mixture. After cooling under nitrogen the residue was dissolved in benzene (180 ml.). Potassium carbonate (10.32 g., 0.075 mole) was added, and then a solution of iodine (18.90 g., 0.075 mole) in benzene (230 ml.) was added.

After stirring at 28° for 15 hours, the supernatant solution was washed in succession with aqueous sodium thiosulfate, aqueous sodium hydroxide and water. Drying and subsequent removal of the solvent left 3.48 g. of a mixture of the starting iminonitrile and isothiazole. The material was chromatographed on alumina (elution with benzene/Skellysolve B) to yield 0.85 g. (7%) of pure isothiazole nitrile. Recrystallization (ethanol) gave material with M.P. 125–126°;

$\lambda_{max}^{EtOH}$ 255 ($\epsilon$8,200)

*Analysis.*—Calc'd for $C_{11}H_6Cl_2N_2S$: C, 49.09; H, 2.25; Cl, 26.35; N, 10.41; S, 11.91. Found: C, 49.06; H, 2.31; Cl, 25.99; N, 10.31; S, 12.00.

3-(2,6-dichlorophenyl)-5-methyl-4-isothiazole-carboxylic acid

A mixture of 3-(2,6-dichlorophenyl)-5-methyl-4-isothiazole carbonitrile (729.5 mg.), ethylene glycol (3.3 ml.), water (0.66 ml.) and potassium hydroxide (0.33 g.) was heated under reflux for 49 hours.

The mixture was poured onto ice (11 g.). Acidification with hydrochloric acid (6 N) gave crystalline solid which was washed with water and dried; yield: 670.0 mg. (86%), M.P. 210–212°. Recrystallization (benzene/Skellysolve B) gave 550 mg., M.P. 213.5–215°.

$\lambda_{max}^{EtOH}$ 253 ($\epsilon$7,550)

*Analysis.*—Calc'd for $C_{11}H_7Cl_2NO_2S$: C, 45.85; H, 2.45; Cl, 24.61; N, 4.86; S, 11.13. Found: C, 46.10; H, 2.57; Cl, 24.56; N, 4.76.

Sodium 6-[3-(2,6-dichlorophenyl)-5-methyl-4-isothiazolecarboxamido]-penicillanate hydrate To 577 mg. (0.002 mole) of 3-(2,6-dichlorophenyl)-5-methyl-4-isothiazolecarboxylic acid was added 5 ml. of thionyl chloride and the resulting solution refluxed gently for one and a half hours. The excess $SOCl_2$ was removed in vacuo at 25° C. leaving a crystalline residue which was immediately dissolved in 5 ml. of acetone and added all at once to a previously prepared, stirred and cooled solution (5° C.) of 500 mg. 6-APA, 500 mg. of $NaHCO_3$, 10 ml. of water and 5 ml. of acetone. Stirring at 5° to 10° C. was continued for 10 minutes and then for 30 minutes with the ice bath removed. The acetone was then removed at 20° C. under reduced pressure and 20 ml. $H_2O$ added to the concentrate. This aqueous solution was extracted once with 50 ml. of ether and the ether discarded. The aqueous solution was then layered with 40 ml. of ethyl acetate and stirred and cooled while being acidified to pH 2 with excess 40% $H_3PO_4$. The ethyl acetate layer was washed with three 25 ml. portions of water and two 25 ml. portions of saturated NaCl solution. Next, the organic layer was dried 10 minutes over $Na_2SO_4$, filtered, and treated with 0.740 ml. (0.002 mole) of SEH (a solution of sodium 2-ethylhexanoate in n-butanol whose concentration is 37 ml.=0.1 mole). The ethyl acetate solution was concentrated at 20° C. under reduced pressure to an oil and the oil redissolved in 25 ml. methyl isobutyl ketone. Two drops of water were added and the sides of the flask scratched. After one hour there was collected 840 mg. of MIBK washed, acetone washed, pet. ether washed and air dried material. It decomposed slowly above 182° C. and its infrared spectra was entirely consistent with the desired structure indicating a high degree of purity and containing water of crystallization.

*Analysis.*—Calc'd for $C_{19}H_{14}Cl_2N_3NaO_3S_2 \cdot H_2O$: C, 44.88; H, 3.18; N, 8.27; $H_2O$, 3.53. Found: C, 45.20; H, 3.55; N, 7.92; $H_2O$, 2.86 (Karl Fischer).

EXAMPLE 9

4-cyano-3,5-dimethylisothiazole 3-iminobutyronitrile (10 g.) and S-carboxymethyldithioacetate (18.3 g.) were placed in 200 ml. of benzene and refluxed for 65 minutes. The dark solution was cooled to room temperature following which $K_2CO_3$(25.3 g.) and iodine (46.4 g.) dissolved in 560 ml. benzene was added to the solution with stirring.

After stirring for 15 hours at 28° C., the mixture was washed with water, aqueous $Na_2S_2O_3$, $H_2O$, 0.5 N NaOH, 0.1 N HCl and water. The benzene phase was dried over $Na_2SO_4$, filtered and taken to a semi-solid (4.97 g., 30%) in vacuo.

The material was chromatographed on alumina, the fraction eluted with 1:1 benzene-petroleum ether being the desired product, M.P. 51–54°, rep. M.P. 50–54° C. (Caton et al., J. Chem. Soc., 446–451 (1964)).

*Analysis.*—Calc'd for $C_6H_6N_2S$: C, 52.17; H, 4.38; N, 20.28; S, 23.17. Found: C, 52.00; H, 4.61; N, 19.99; S, 23.25.

EXAMPLE 10

2-chloro-6-fluorobenzonitrile 2-chloro-6-fluorobenzaldoxime, prepared from 2-chloro-6-fluorobenzaldehyde [C.A. 31, 381[6]; Berichte, 69B, 2253 (1936)] is refluxed with acetic anhydride to produce 2-chloro-6-fluorobenzonitrile by the method of M. S. Reich, Bull. Soc. Chim., France, (4) 21, 217 (1917).

3-amino-3-(2-chloro-6-fluorophenyl)-propionitrile

The preparation of 3-imino-3-(2-chloro - 6 - fluorophenyl)-propionitrile generally follows the procedure of Holzwart, J. Prakt. Chem., [2], 39, 242, whereby a mixture of 2-chloro-6-fluorobenzonitrile and acetonitrile are added to a suspension of sodium metal, refluxed and isolated in a manner similar to that described in Example 1.

3-(2-chloro-6-fluorophenyl)-5-methyl-4-isothiazolecarboxylic acid

In a manner similar to that described in Example 1, equimolar quantities of 3-imino-3-(2-chloro-6-fluorophenyl)-propionitrile and S-carboxymethyldithioacetate are heated together in the absence of a solvent. After cooling and dissolving the residues in benzene, a solution of iodine in benzene is added, followed by solid $K_2CO_3$.

After stirring for 20 hours at room temperature, the mixture is washed with aqueous sodium thiosulfate, aqueous sodium hydroxide, water and then dried over $Na_2SO_4$. Following removal of the solvent, the resultant oil or semi-solid is hydrolyzed at reflux temperatures using methanol, water and sodium hydroxide. The solution is acidified, the crystalline precipitate collected and recrystallized from ethanol-water to yield analytically pure product, M.P. 199–201° C.

*Analysis.*—Calc'd for $C_{11}H_7ClFNO_2S$: C, 48.53; H, 2.59; S, 11.76. Found: C, 49.30, 48.96; H, 2.89, 2.71; S, 11.80, 11.88.

EXAMPLE 11

2,6-dichloro-4-methylbenzonitrile 2,6-dichloro-4-methylbenzaldoxime prepared from 2,6-dichloro-4-methylbenzaldehyde [C.A. 31, 381[6]; Berichte, 69B, 2253 (1936)], is refluxed with acetic anhydride to produce 2,6-dichloro-4-methylbenzonitrile by the method of M. S. Reich, Bull. Soc. Chim., France, (4) 21, 217 (1917).

3-imino-3-(2,6-dichloro-4-methylphenyl)-propionitrile

The preparation of 3-imino-3-(2',6'-dichloro-4'-methylphenyl)-propionitrile generally follows the procedure of Holzwart, J. Prakt. Chem., [2], 39, 242 whereby a mixture of 2,6-dichloro-4-methylbenzonitrile and acetonitrile are added to a suspension of sodium metal, refluxed and isolated in a manner similar to that described in Example 1.

3-(2,6-dichloro-4-methylphenyl)-5-methyl-4-isothiazolecarboxylic acid

Substitution in the procedure of Example 1, for the 3-imino-3-phenylpropionitrile used therein of 3-imino-3-(2,6-dichloro-4-methylphenyl)-propionitrile produces 3-(2,6-dichloro - 4 - methylphenyl)-5-methyl-4-isothiazolecarboxylic acid.

EXAMPLE 12

2,4,6-trichlorobenzonitrile 2,4,6-trichlorobenzaldoxime is refluxed with acetic anhydride to produce 2,4,6-trichlorobenzonitrile as in Example 11.

3-imino-3-(2,4,6-trichlorophenyl)-propionitrile

The preparation of 3-imino-3-(2,4,6-trichlorophenyl)-propionitrile generally follows the procedure of Holzwart, J. Prakt. Chem., [2], 39, 242, whereby a mixture of 2,4,6-trichlorobenzonitrile and acetonitrile are added to a suspension of sodium metal, refluxed and isolated in a manner similar to that described in Example 1.

3-(2,4,6-trichlorophenyl)-5-methyl-4-isothiazole-carboxylic acid

Substitution in the procedure of Example 1 for the 3-imino-3-phenylpropionitrile used therein of 3-imino-3-(2,4,6-trichlorophenyl)-propionitrile produces 3-(2,4,6-trichloro)-5-methyl-4-isothiazolecarboxylic acid.

EXAMPLE 13

2-chloro-6-fluoro-4-methoxybenzonitrile 2-chloro-6-fluoro-4-methoxybenzaldoxime is refluxed with acetic anhydride to produce 2-chloro-6-fluoro-4-methoxybenzonitrile as in Example 11.

3-imino-3-(2-chloro-6-fluoro-4-methoxyphenyl)-propionitrile

The preparation of 3-imino-3-(2-chloro-6-fluoro-4-methoxyphenyl)-propionitrile generally follows the procedure of Holzwart, J. Prakt. Chem., [2], 39, 242, whereby a mixture of 2-chloro-6-fluoro-4-methoxybenzonitrile and acetonitrile are added to a suspension of sodium metal, refluxed and isolated in a manner similar to that described in Example 1.

3-(2-chloro-6-fluoro-4-methoxyphenyl)-5-methyl-4-isothiazole-carboxylic acid

Substitution in the procedure of Example 1 for the 3-imino-3-phenylpropionitrile used therein of 3-imino-3-2-chloro - 6 - fluoro-4-methoxyphenyl)-propionitrile produces 3 - (2-chloro-6-fluoro-4-methoxyphenyl)-5-methyl-4-isothiazolecarboxylic acid.

EXAMPLE 14

5-methyl-3-(4-trifluoromethylphenyl)-4-isothiazolecarboxylic acid

Substitution in the procedure of Example 1 for the 3-imino-3-phenylpropionitrile used therein of 3-imino-3-(4-trifluoromethylphenyl)-propionitrile, prepared by the reaction of 4-trifluoromethylbenzonitrile with acetonitrile via the procedure of Holzwart, produces 5-methyl-3-(4-trifluoromethylphenyl)-4-isothiazolecarboxylic acid.

EXAMPLE 15

5-methyl-3-[2,6-di(trifluoromethyl)phenyl]-4-isothiazolecarboxylic acid

Substitution in the procedure of Example 1 for the 3-imino-3-phenylpropionitrile used therein of 3-imino-3-[2,6-di(trifluoromethyl)phenyl]-propionitrile, prepared by the reaction of 2,6-di(trifluoromethyl)-benzonitrile with acetonitrile via the procedure of Holzwart, produces 5-methyl - 3 - [2,6 - di(trifluoromethyl)phenyl] - 4 - isothiazolecarboxylic acid.

EXAMPLE 16

Ethyl 3-imino-3-(3-nitrophenyl)-propionate

Substitution in the procedure of Example 2 for the bromobenzene used therein of 3-nitro-1-bromobenzene produces ethyl 3-imino-3-(3-nitrophenyl)propionate according to the procedure of R. Lukes and J. Kloubek, Coll. Czechoslov. Chem. Communs., 25, 607 (1960) (Chem. abs., 50, 7796); R. Lukes and J. Kovar, Chem. Listy, 50, 272 (1956) (Chem. abs. 54, 11984).

5-methyl-3-(3-nitrophenyl)-4-isothiazole-carboxylic acid

Substitution in the procedure of Example 6 for the ethyl 3-aminocinnamate used therein of ethyl 3-imino-3-

(3-nitrophenyl)-propionate, produces 5-methyl-3-(3-nitrophenyl)-4-isothiazolecarboxylic acid, M.P. 235–236° C.

EXAMPLE 17

5-methyl-3-(4-methoxyphenyl)-4-isothiazolecarboxylic acid

Substitution in the procedure of Example 1 for the 3-imino-3-phenylpropionitrile used therein of 3-imino-3-(4-methoxyphenyl)-propionitrile, prepared by the reaction of 4-methoxybenzonitrile with acetonitrile via the procedure of Holzwart, produces 5-methyl-3-(4-methoxyphenyl)-4-isothiazolecarboxylic acid, M.P. 148–150° C.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit of the invention.

I claim:

1. The process for the synthesis of isothiazoles having the formula

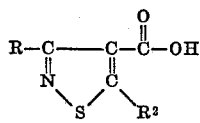

wherein R and $R^2$ are alike or different and each is (lower)alkyl or Ar—, wherein Ar is a group of the formula

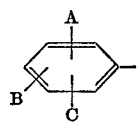

in which each of A, B and C represent hydrogen, fluoro, chloro, bromo, iodo, trifluoromethyl, methylsulfonyl, nitro, (lower)alkyl and (lower)alkoxy; which comprises the consecutive steps of:

(a) *heating* a substantially equimolar of two reactants having the formulae

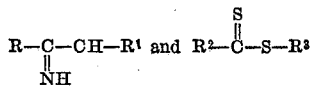

wherein

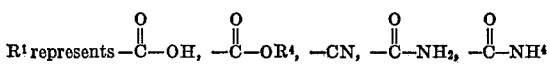

or

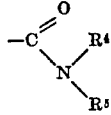

in which $R^4$ and $R^5$ are alike or different and are each (lower)alkyl or Ar—, and $R^3$ represents (lower)alkyl, —$C_nH_{2n}CH_2COOH$,

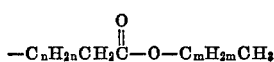

or —$C_nH_{2n}CH_2CN$ in which n and m are each an integer from zero to six inclusive, and to a temperature in the range of 50°–300° C. under reduced pressure in the absence of a solvent *or* in an inert solvent up to reflux temperature;

(b) subjecting the heated mixture to *mild oxidation* by contact with chloranil, $I_2$, $Br_2$, $Cl_2$, or iodine in combination with an acid scavenger in an inert solvent at about room temperature; and when $R^1$ is other than

(c) *hydrolyzing* the resultant, oxidized product to a compound of the formula

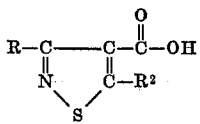

by contact with a strong mineral acid or alkali metal base with the aid of heat.

2. The process of claim 1 for the synthesis of isothiazoles having the formula

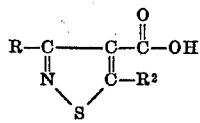

wherein $R^2$ is (lower)alkyl and R is Ar, Ar being of the formula

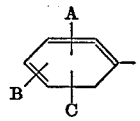

in which each of A, B and C represent hydrogen, fluoro, chloro, bromo, iodo, trifluoromethyl, methylsulfonyl, nitro, (lower)alkyl and (lower)alkoxy which comprises the consecutive steps of:

(a) *heating* a substantially equimolar mixture of two reactants having the formulae

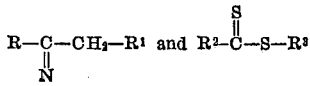

wherein

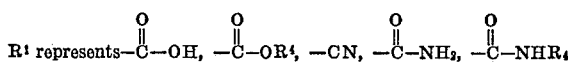

or

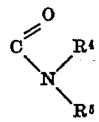

in which $R^4$ and $R^5$ are alike or different and are each (lower)alkyl or Ar—, and $R^3$ represents (lower)alkyl, radicals of the class —$C_nH_{2n}CH_2COOH$,

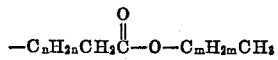

or —$C_nH_{2n}CH_2CN$ in which n and m are each an integer from zero to six inclusive, and to a temperature in the range of 50°–300° C. under reduced pressure in the absence of a solvent *or* in an inert solvent up to reflux temperature;

(b) subjecting the heated mixture to *mild oxidation* by contact with $I_2$,$Br_2$, $Cl_2$, chloranil, or iodine in combination with an acid scavenger in an inert solvent at about room temperature; and when $R^1$ is other than

(c) *hydrolyzing* the resultant, oxidized product to a compound of the formula

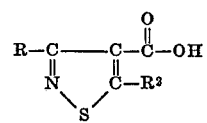

by contact with a strong mineral acid or alkali metal base with the aid of heat.

3. The process of claim 1 for the synthesis of isothiazoles having the formula

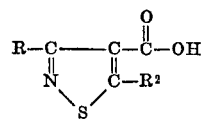

wherein $R^2$ is (lower)alkyl and R is Ar, Ar being a group of the formula

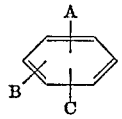

in which each of A, B and C represent hydrogen, fluoro, chloro, bromo, iodo, trifluoromethyl, (lower)alkyl and (lower)alkoxy; which comprises the consecutive steps of:

(a) *heating* a substantially equimolar mixture of two reactants having the formulae

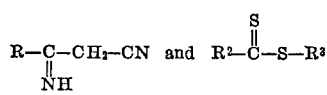

wherein $R^3$ represents (lower)alkyl, radicals of the class —$C_nH_{2n}CH_2COOH$,

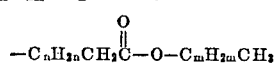

or —$C_nH_{2n}CH_2CN$ in which $n$ and $m$ are each an integer from zero to six inclusive, and to a temperature in the range of 50°–300° C. under reduced pressure in the absence of a solvent *or* in an inert solvent up to reflux temperature;

(b) subjecting the heated mixture to *mild oxidation* by contact with $I_2$, $Br_2$, $Cl_2$, chloranil, or iodine in combination with an acid scavenger in an inert solvent at about room temperature; and (c) *hydrolyzing* the resultant, oxidized product to a compound of the formula

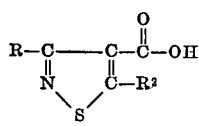

by contact with a strong mineral acid or alkali metal base with the aid of heat.

4. The process of claim 1 for the synthesis of isothiazoles having the formula

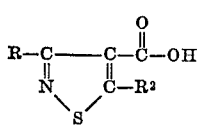

wherein $R^2$ is (lower)alkyl and R is Ar, Ar being a group of the formula

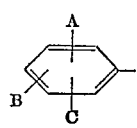

in which each of A, B and C represent hydrogen, fluoro, chloro, bromo, iodo, tirfluoromethyl, (lower)alkyl and (lower)alkoxy; which comprises the consecutive steps of:

(a) *heating* a mixture, and preferably a substantially equimolar mixture, of two reactants having the formulae

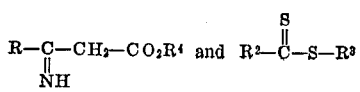

in which $R^4$ is (lower)alkyl and $R^3$ represents (lower)alkyl, radicals of the class —$C_nH_{2n}CH_2COOH$,

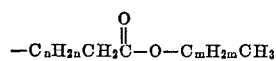

or $C_nH_{2n}CH_2CN$ in which $n$ and $m$ are each an integer from zero to six inclusive, and to a temperature in the range of 50°–300° C. under reduced pressure in the absence of a solvent *or* in an inert solvent up to reflux temperature;

(b) subjecting the heated mixture to *mild oxidation* by contact with $I_2$, $Br_2$, $Cl_2$, chloranil, or iodine in combination with an acid scavenger in an inert solvent at about room temperature;

(c) *hydrolyzing* the resultant, oxidized product to a compound of the formula

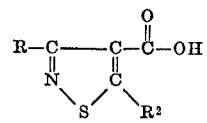

by contact with strong mineral acid or alkali metal base, with the aid of heat.

5. The process of claim 1 for the synthesis of isothiazoles having the formula

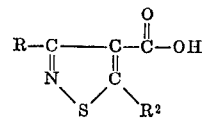

wherein $R^2$ is (lower)alkyl and R is Ar, Ar being a group of the formula

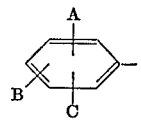

in which each of A, B and C represent hydrogen, fluoro, chloro, bromo, iodo, trifluoromethyl, (lower)alkyl and (lower)alkoxy; which comprises the consecutive steps of:

(a) *heating* a substantially equimolar mixture, of two reactants having the formulae

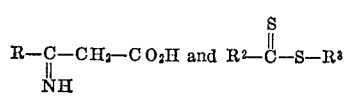

wherein $R^3$ represents (lower)alkyl, radicals of the class —$C_nH_{2n}CH_2COOH$,

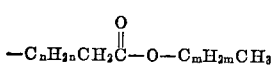

or —$C_nH_{2n}CH_2CN$ in which $n$ and $m$ are each an integer from zero to six inclusive, and to a temperature in the range of 50°–300° C. under reduced pressure in the absence of a solvent *or* in an inert solvent up to reflux temperature; and (b) subjecting the heated mixture to *mild oxidation* by contact with $I_2$, $Br_2$, $Cl_1$, chloranil, or iodine in combination with an acid scavenger in an inert solvent at about room temperature to yield the desired isothiazole.

6. The process for the synthesis of isothiazoles having the formula

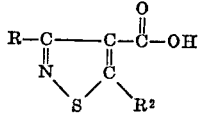

wherein $R^2$ is (lower)alkyl and R is Ar, Ar being of the formula

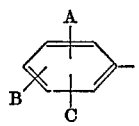

in which each of A, B and C represent hydrogen, fluoro, chloro, bromo, iodo, trifluoromethyl, methylsulfonyl, nitro, (lower)alkyl and (lower)alkoxy; which comprises subjecting a compound of the formula:

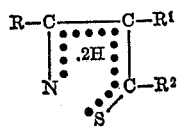

wherein $R^1$ represents $-\overset{O}{\underset{\|}{C}}-OH$, $-\overset{O}{\underset{\|}{C}}-OR^4$, $-CN$, $-\overset{O}{\underset{\|}{C}}-NH_2$, $-\overset{O}{\underset{\|}{C}}-NHR^4$ or

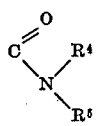

in which $R^4$ and $R^5$ are each (lower)alkyl or Ar; to *mild oxidation* by contact with 2,3-dichloro-5,6-dicyano-1,4-benzoquinone, oxygen, air, $I_2$, $Br_2$, $Cl_2$, halogen in combination with an acid scavenger, $H_2O_2$, sulfur, $FeCl_3$, $Na_2S_2O_8$, or chloranil in an inert solvent at about room temperature; and when $R^1$ is other than

*hydrolyzing* the resultant, oxidized product to a compound of the formula

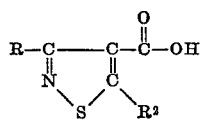

by contact with a strong mineral acid or alkali metal base with the aid of heat.

7. The process of claim 6 for the synthesis of isothiazoles having the formula

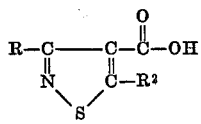

wherein $R^2$ is (lower)alkyl and R is Ar, Ar being a group of the formula

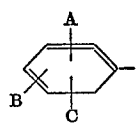

in which each of A, B and C represent hydrogen, fluoro, chloro, bromo, iodo, trifluoromethyl, (lower)alkyl and (lower)alkoxy; which comprises subjecting a compound of the formula:

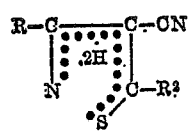

to *mild oxidation* by contact with $I_2$, $Br_2$, $Cl_2$, chloranil, or iodine in combination with an acid scavenger in an inert solvent at about room temperature; and *hydrolyzing* the resultant, oxidized product to a compound of the formula

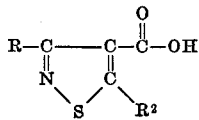

by contact with a strong mineral acid or alkali metal base with the aid of heat.

8. The process of claim 6 for the synthesis of isothiazoles having the formula

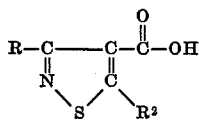

wherein $R^2$ is (lower)alkyl and R is Ar, Ar being a group of the formula

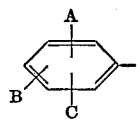

in which each of A, B and C represent hydrogen, fluoro, chloro, bromo, iodo, trifluoromethyl, (lower)alkyl and (lower)alkoxy; which comprises subjecting a compound of the formula:

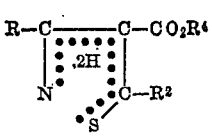

wherein $R^4$ is (lower)alkyl or Ar-, to *mild oxidation* by contact with $I_2$, $Br_2$, $Cl_2$, chloranil, or iodine in combination with an acid scavenger in an inert solvent at about room temperature; and *hydrolyzing* the resultant, oxidized product to a compound of the formula

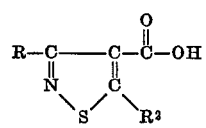

by contact with strong mineral acid or alkali metal base, with the aid of heat.

9. The process of claim 6 for the synthesis of isothiazoles having the formula

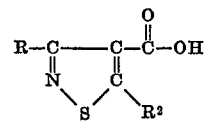

wherein $R^2$ is (lower)alkyl and R is Ar, Ar being a group of the formula

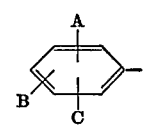

in which each of A, B and C represent hydrogen, fluoro, chloro, bromo, iodo, trifluoromethyl, (lower)alkyl and (lower)alkoxy; which comprises subjecting a compound of the formula

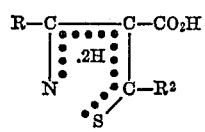

to *mild oxidation* by contact with $I_2$, $Br_2$, $Cl_2$, chloranil, or iodine in combination with an acid scavenger in an inert solvent at about room temperature to yield the desired isothiazole.

References Cited

UNITED STATES PATENTS 3,341,518  12/1967  Naito et al. _____ 260—302

ALEX MAZEL, Primary Examiner

R. J. GALLAGHER, Assistant Examiner

U.S. Cl. X.R.

260—239.1, 293, 293.4, 294.7, 465, 465.5, 470, 479, 481, 516, 534, 558, 559, 561, 562, 999

PO-1050
(5/69)

UNITED STATES PATENT OFFICE
CERTIFICATE OF CORRECTION

Patent No. 3,471,507          Dated October 7, 1969

Inventor(s) Ronnie R. Crenshaw

It is certified that error appears in the above-identified patent and that said Letters Patent are hereby corrected as shown below:

In the claims, the fourth formul of claim 1 should read as follows:

$$R^1 \text{ represents } -\overset{O}{\underset{\|}{C}}-OH, -\overset{O}{\underset{\|}{C}}-OR^4, -CN, -\overset{O}{\underset{\|}{C}}-NH_2, -\overset{O}{\underset{\|}{C}}-NHR^4$$

(column 17, lines 47-50)

the third formula of claim 2 should read as follows:

$$R-\underset{\underset{NH}{\|}}{C}-CH_2-R^1 \quad \text{and} \quad R^2-\overset{S}{\underset{\|}{C}}-S-R^3$$

(column 18, lines 32-35)

SIGNED AND
SEALED
MAY 12 1970

(SEAL)
Attest:

Edward M. Fletcher, Jr.          WILLIAM E. SCHUYLER, JR.
Attesting Officer          Commissioner of Patents